DEFENSIVE PUBLICATION T868012

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 18, 1969

868 O.G. 729

841,605

PREPARATION OF HYDROLYZED COPOLYMERS IN THE SOLID FORM

John E. Bristol, 1336 Saunders Settlement Road, Niagara Falls, N.Y. 14305

Continuation-in-part of applications Ser. No. 605,999, Dec. 30, 1966, Ser. No. 684,475, Nov. 20, 1967, and Ser. No. 706,782, Feb. 20, 1968. This application July 14, 1969. Published Nov. 18, 1969

Int. Cl. C08f *19/10*

U.S. Cl. 260—87.3

No Drawing. 11 Pages Specification

A process is provided for the production of a polymer containing hydroxyl groups. The process comprises subjecting a solid copolymer of an olefinic hydrocarbon (ethylene) and up to 50 weight percent of an ester of an unsaturated alcohol (vinyl acetate) to the action of a hydrolyzing agent (methanol) while the copolymer is immersed in the hydrolyzing agent in the solid form.